US012801207B2

(12) United States Patent
McLachlan et al.

(10) Patent No.: US 12,801,207 B2
(45) Date of Patent: Nov. 17, 2026

(54) SYSTEMS AND METHODS FOR LABELING AND PRIORITIZATION OF SENSORY EVENTS IN SENSORY ENVIRONMENTS

(71) Applicant: Telefonaktiebolaget LM Ericsson (publ), Stockholm (SE)

(72) Inventors: Paul McLachlan, San Francisco, CA (US); Gregoire Phillips, Hayward, CA (US); Saeed Bastani, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 18/552,166

(22) PCT Filed: Jun. 16, 2021

(86) PCT No.: PCT/IB2021/055340
§ 371 (c)(1),
(2) Date: Sep. 22, 2023

(87) PCT Pub. No.: WO2022/200844
PCT Pub. Date: Sep. 29, 2022

(65) Prior Publication Data
US 2024/0176414 A1 May 30, 2024

Related U.S. Application Data
(60) Provisional application No. 63/165,936, filed on Mar. 25, 2021.

(51) Int. Cl.
*G06F 3/01* (2006.01)
*G06F 3/16* (2006.01)
(Continued)

(52) U.S. Cl.
CPC ............ *G06F 3/011* (2013.01); *G09G 3/001* (2013.01); *G06F 3/016* (2013.01); *G06F 3/16* (2013.01);
(Continued)

(58) Field of Classification Search
None
See application file for complete search history.

(56) References Cited

U.S. PATENT DOCUMENTS 10,127,731 B1 * 11/2018 Ozery .................... G08B 25/08
2008/0259956 A1 * 10/2008 Baek .................. H04L 12/2803 370/469
(Continued)

FOREIGN PATENT DOCUMENTS

WO WO-2014162825 A1 * 10/2014 ........... G06T 19/006
WO WO-2019132744 A1 * 7/2019 ........ H04W 28/0278
(Continued)

OTHER PUBLICATIONS

Bachhuber, Christoph, et al. "Edge cloud-based augmented reality." 2019 IEEE 21st International Workshop on Multimedia Signal Processing (MMSP). IEEE, 2019. (Year: 2019).*
(Continued)

*Primary Examiner* — Zhengxi Liu
(74) *Attorney, Agent, or Firm* — Nicholson De Vos Webster & Elliott LLP

(57) ABSTRACT

The present disclosure relates to labeling, prioritization, and processing of event data. A system receives event data from one or more sensors, wherein the event data represents an event detected in a sensory environment, and processes the event data, including: performing a localization operation using the event and performing a labeling operation using the event data. The system determines, based on a set of criteria, whether to perform a prioritization action related to
(Continued)

the event data and, in response to determining to perform a prioritization action, performs one or more prioritization action including causing prioritized output, by one or more sensory feedback devices of a user device, of sensory feedback in at least one sensory dimension based on the event data, the location data, and the one or more label.

14 Claims, 10 Drawing Sheets

(51) Int. Cl.
*G09G 3/00* (2006.01)
*H04L 47/80* (2022.01)

(52) U.S. Cl.
CPC ................. *G09G 2320/028* (2013.01); *G09G 2340/0407* (2013.01); *G09G 2354/00* (2013.01); *G09G 2370/022* (2013.01); *H04L 47/801* (2013.01)

(56) References Cited

U.S. PATENT DOCUMENTS

| | | | | |
|---|---|---|---|---|
| 2014/0085480 | A1* | 3/2014 | Saptharishi | H04N 21/23113 348/159 |
| 2016/0098305 | A1* | 4/2016 | Bucsa | H04L 67/125 719/318 |
| 2016/0309141 | A1* | 10/2016 | Pulli | G06T 5/50 |
| 2016/0360180 | A1* | 12/2016 | Cole | H04N 23/698 |
| 2018/0136720 | A1* | 5/2018 | Spitzer | G06T 1/20 |
| 2018/0137680 | A1 | 5/2018 | Nocon et al. | |
| 2018/0357810 | A1* | 12/2018 | Young | G06T 15/005 |
| 2020/0110935 | A1* | 4/2020 | Paul | G08B 19/00 |
| 2020/0351380 | A1* | 11/2020 | Fedorov | H04W 4/70 |
| 2020/0356917 | A1 | 11/2020 | Sharma et al. | |
| 2020/0366619 | A1* | 11/2020 | Westberg | H04W 28/0247 |
| 2021/0149707 | A1* | 5/2021 | Thyagaturu | G06F 9/544 |

FOREIGN PATENT DOCUMENTS

| | | | |
|---|---|---|---|
| WO | 2022/139636 | A1 | 6/2022 |
| WO | 2022/139643 | A1 | 6/2022 |

OTHER PUBLICATIONS

Balaji Ethirajulu, "How 5G and Edge Computing can enhance virtual reality," available online at <https://www.ericsson.com/en/blog/2020/4/how-5g-and-edge-computing-can-enhance-virtual-reality>, Apr. 8, 2020, 7 pages.

Calum Mcclelland, "LiDAR Technology: Not Just for Autonomous Vehicles," available online at <https://www.iotforall. com/lidar-technology>, Dec. 3, 2024, 11 pages.

Chris Wiltz, "5 Major Challenges for VR to Overcome," available online at <https://www.designnews.com/testing-measurement/5-major-challenges-for-vr-to-overcome>, Apr. 28, 2017, 6 pages.

Emre Dandil et al., "Computer Vision Based Distance Measurement System using Stereo Camera View," IEEE, 2019, 4 pages.

Jonathan Greig, "Ericsson explores "internet of senses" using AR, VR, and 5G by 2030," available online at <https://web.archive.org/web/20201031224809/https://www.techrepublic.com/article/ericsson-explores-internet-of-senses-using-ar-vr-and-5g-by-2030/>, Oct. 30, 2020, 9 pages.

Pierluigi Zama Ramirez et al., "Shooting Labels: 3D Semantic Labeling by Virtual Reality," Oct. 24, 2020, 8 pages.

Rebecca Hills-Duty, "Edge Computing for Better VR and AR Experiences," VR Focus. May 10, 2018, 5 pages, available online at <https://web.archive.org/web/20211024180108/https://www.vrfocus.com/2018/05/edge-computing-for-better-vr-and-ar-experiences/>.

Rob Matheson, "Machine-learning system tackles speech and object recognition, all at once," available online at <https://news.mit.edu/machine-learning-image-object-recognition-0918>, Sep. 18, 2018, 6 pages.

Ryan William, "What is Lidar Scanner and How Does It Help Augmented Reality?," available online at <https://web.archive.org/web/20231204033609/https://arvrtips.com/lidar-scanner-ar/>, Mar. 27, 2020, 11 pages.

Ruiwei Shen et al., "A System for Visualizing Sound Source using Augmented Reality," MoMM2012, Dec. 3-5, 2012, 9 pages.

* cited by examiner

300

| | | | | | | |
|---|---|---|---|---|---|---|
| 0ABCD12EFGHI34578 | YYYYMMDD | HH:MM:SS | 01000001 01000001 | 0001 | 001 | 0001 |
| [UE Identification Number] | [Date] | [Time] | [Latitude and Longitude] | [Altitude] | [Data Type] | [Checksum] |

*FIG. 3*

SYSTEMS AND METHODS FOR LABELING AND PRIORITIZATION OF SENSORY EVENTS IN SENSORY ENVIRONMENTS

CROSS-REFERENCE TO RELATED APPLICATIONS

This application is a National stage of International Application No. PCT/IB2021/055340, filed Jun. 16, 2021, which claims priority to U.S. Provisional Application No. 63/165,936, filed on Mar. 25, 2021, titled SYSTEMS AND METHODS FOR LABELING AND PRIORITIZATION OF SENSORY EVENTS IN SENSORY ENVIRONMENTS, the contents of which are incorporated herein by reference in its entirety.

TECHNICAL FIELD

This application relates to labeling, prioritization, and processing of event data, and in particular to providing sensory feedback related to a sensed event in a sensory environment.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Collectively referred to as extended reality (XR), augmented and virtual reality allow end users to immerse themselves in and interact with virtual environments and overlays rendered in screen space (alternatively referred to as "screenspace"). No currently available commercial XR headset contains a 5G New Radio (NR) or 4G Long Term Evolution (LTE) radio. Instead, headsets use cables to physically connect to computers or tether to local WiFI networks. Such tethering addresses inherent speed and latency issues in LTE and earlier generations of mobile networks at the cost of allowing users to interact with environments and objects outside of this environment. The rollout of 5G NR, paired with edgecloud computing, will support future generations of mobile network enabled XR headsets. These two advances will allow users to experience XR wherever they go.

These technologies will also expand the types of interactive content and types of sensory experiences XR users can enjoy. Today, these experiences are limited to visual overlays, audio, and basic haptic feedback. These XR experiences will grow in maturity to include rich three-dimensional audio and tactile sensations such as texture. Researchers also anticipate that advances in actuator technology will enable end users to experience smell and taste in XR. This will create a rich, immersive sensory environment for XR users.

SUMMARY

The increasing adoption of XR motivates the need to rapidly localize sensory inputs in the environment and generate visual overlays or other types of feedback such that end users retain situational awareness. Examples of prompts to maintain situational awareness include alerts in screenspace about unexpected audio, such as an approaching vehicle or smoke alarm. Other examples of sensory alerts include those related to smells (e.g., mercaptan in natural gas) or strobing lights as smoke alarms for the deaf and hard of hearing. There is no current method that encodes sensory data from the environment, maps those data within three-dimensional space, and generates XR alerts or overlays related to the sensory data.

There currently exist certain challenges. This disclosure introduces techniques to address these three challenges in a unified framework. First, the techniques described herein can allow XR headsets and other sensors to continuously gather and share sensory data for processing. As this processing can occur both on the device or in the edgecloud, we show how data can be pooled from multiple devices or sensors to improve localization. Second, the techniques described herein can encode and localize sensory data from the end user's environment. Building on prior research, this encoding allows deployments to localize sensory data in three-dimensional space. Examples include a sound's angle of approach to the user or the intensity of a smell over space. Finally, the techniques described herein introduce a method to convert this geospatially encoded sensory data into overlays or other forms of XR alerts. No existing process supports this in real-time or for XR.

This the techniques described herein can also support alerts for sensory-impaired users as a form of adaptive technology. First, the techniques described herein can allow end users to choose how to receive alerts and for these choices to vary depending upon location, current XR usage, and input type. For example, a hard-of-hearing user may prefer tactile alerts when using XR with no sound and a visual alert in screenspace in the presence of XR-generated audio. Second, by encoding sensory data and localizing them, the techniques described herein can allow cross-sensory alerts. For example, the techniques described herein can allow fully deaf users to always receive visual alerts in screenspace for audio data.

Overall, the techniques described herein contribute to a growing focus on adaptive technology while extending the consumer usefulness of the above-described advances: the robust use of low latency networks in XR, the real-time (or near-real-time) fathering and processing of contextual environmental information, and the use of sensory data on one dimension (audio, visual, or tactile) to inform end users of stimulation on another dimension on which they may have a deficiency.

The rollout of edge-computing supplemental technologies in conjunction with 5G allow for low enough latency to facilitate smooth end user experiences with XR technology - including experiences that exceed the processing power of end user's own devices. However, while this rollout and advances improving its implementation provide the potential for simultaneous identification, labeling, and rendering around stimulus in an XR environment, they do so without providing a mechanism for carrying this out. Similarly, the introduction of advanced LiDAR technologies to use optical sensors to detect and estimate distances and measurement features in visual data provides the foundation to detect and potentially measure visual stimulation, but its application is limited to visual data. Finally, cloud-enabled ML classifiers have become an industry standard in object recognition, identification, and classification on nearly every level—from social media applications to state-of-the-art AR deployment to industrial order-picking problems to self-driving vehicles.

These advances are formidable. However, while impressive in their scope, the current state of the art alone does not solve the issue of sensory-immersive contextual awareness as laid out above. To address sensory detection, identification, and rendering issues as they emerge in the coming Internet of Senses, we will need a mechanism that leverages these advances to solve these problems directly in an XR context.

The embodiments described herein seek to advance the technology in at least the following four exemplary ways: (1) this disclosure introduces techniques for using network-based computing to place overlays and generate sensory (visual, audio, haptic, etc.) feedback based on pre-identified stimulus on that overlay in real time: (2) this disclosure introduces a flexible model architecture that uses an end user's sensory environment to prioritize the rendering of the XR environment: (3) this disclosure proposes using a machine learning framework to extrapolate and demarcate navigation to or awareness of the source of sensation in a spatial layer, to engineer a mechanism that generalizes this system to other sensory dimensions; and (4) this disclosure introduces the placement of a sensory overlay that detects features of end user's environment and translates the stimulation associated with the area covered by the overlay into end-user-specified alternative sensations to communicate specific information to end user. Additional aspects introduced herein is the capability to use sensory data from a third-party sensor to replace (or augment) data from a (e.g., faulty) sensor on the end user device (e.g., use microphones from a third-party headset to generate audio overlays for the end user).

Certain aspects of the present disclosure and their embodiments may provide solutions to these or other challenges. This Disclosure proposes a Locating, Labeling, and Rendering (LLR) mechanism that leverages the advances in network connectivity provided by 5G and additional computational resources available in the edgecloud to generate a sensory overlay that identifies and translates sensory stimulation in an XR environment into an alternative form of stimulation perceivable and locatable to the end user in real time. In addition to this identification and modulation from one stimulus to another, the LLR may use sensory information in this overlay to prioritize the rendering of areas in and around the identified sensory stimulation in the XR environment—using sensory data as a cue for rendering VR or AR where sound, smell, visual distortion, or any other sensory stimulation has the highest density, acuity, or any other form of significance. Finally, The LLR may also generate labels over sensory stimulation on pre-identified dimensions of senses to draw an end user's attention to particular sensory stimulation.

Embodiments described herein can include one or more of the following features: a mechanism with the ability to encode sensory data gathered by XR headsets in the environment and localize those data in three-dimensions: functionality that enables end users to dynamically encode and represent multi-dimensional data (e.g., directionality of sound, intensity of smell, etc.) for purposes of generating feedback in another sense on the device or in the edgecloud: the ability to specify the types of labels an end user wishes to receive, with conditions related to time, XR content, and environment: a network-based architecture that allows multiple XR headsets or sensors to pool sensory data together: one sensor informing other sensors based on the preference/capability of the user in using the information.

Embodiments described herein can include one or more of the following features: the ability to use the edgecloud to aggregate sensory data of one type (e.g., audio or visual) provided by multiple sensors, devices, etc. for purposes of improving localization of rendered overlays: the ability to use inputs from multiple sensors (and/or user-defined preferences and cues) to assign priority to rendering of different portions of the XR environment in any sensory dimension (e.g., audio, visual, haptic, etc.) based upon inputs from multiple devices: the use of multiple sensor arrays (e.g., cameras within the same headset) to create labeling overlays that can be used to increase end user environmental awareness and prioritize future overlay placement (e.g., use data from multiple devices or multiple inputs on the same device to generate overlays about the environment from beyond one end user's perspective): the capability to use sensory data from a third-party sensor to replace data from a faulty sensory on the end user (e.g., use microphones from a third-party headset to generate audio overlays for the end user).

There are, proposed herein, various embodiments which address one or more of the issues disclosed herein.

In some embodiments, a computer-implemented method for processing of event data for providing feedback, comprises: receiving event data from one or more sensors, wherein the event data represents an event detected in a sensory environment: processing the event data, including: performing a localization operation using the event data to determine location data representing the event in the sensory environment: and performing a labeling operation using the event data to determine one or more label representing the event: determining, based on a set of criteria, whether to perform a prioritization action related to the event data: and in response to determining to perform a prioritization action, performing one or more prioritization action including causing prioritized output, by one or more sensory feedback devices of a user device, of sensory feedback in at least one sensory dimension based on the event data, the location data, and the one or more label.

In some embodiments, a system for processing event data for providing feedback comprises memory and one or more processor, said memory including instructions executable by said one or more processor for causing the system to: receive event data from one or more sensors, wherein the event data represents an event detected in a sensory environment: process the event data, including: perform a localization operation using the event data to determine location data representing the event in the sensory environment: and perform a labeling operation using the event data to determine one or more label representing the event: determine, based on a set of criteria, whether to perform a prioritization action related to the event data; and in response to determining to perform a prioritization action, perform one or more prioritization action including causing prioritized output, by one or more sensory feedback devices of a user device, of sensory feedback in at least one sensory dimension based on the event data, the location data, and the one or more label.

In some embodiments, a non-transitory computer readable medium comprises instructions executable by one or more processor of a device, said instructions including instructions for: receiving event data from one or more sensors, wherein the event data represents an event detected in a sensory environment: processing the event data, including: performing a localization operation using the event data to determine location data representing the event in the sensory environment: and performing a labeling operation using the event data to determine one or more label representing the event: determining, based on a set of criteria, whether to perform a prioritization action related to the event data: and in response to determining to perform a prioritization action, performing one or more prioritization action including causing prioritized output, by one or more sensory feedback devices of a user device, of sensory feedback in at least one sensory dimension based on the event data, the location data, and the one or more label.

In some embodiments, a transitory computer readable medium comprises instructions executable by one or more processor of a device, said instructions including instructions for: receiving event data from one or more sensors, wherein the event data represents an event detected in a sensory environment: processing the event data, including: performing a localization operation using the event data to determine location data representing the event in the sensory environment: and performing a labeling operation using the event data to determine one or more label representing the event: determining, based on a set of criteria, whether to perform a prioritization action related to the event data: and in response to determining to perform a prioritization action, performing one or more prioritization action including causing prioritized output, by one or more sensory feedback devices of a user device, of sensory feedback in at least one sensory dimension based on the event data, the location data, and the one or more label.

In some embodiments, a system for processing event data for providing feedback comprises: means for receiving event data from one or more sensors, wherein the event data represents an event detected in a sensory environment: means for processing the event data, including: means for performing a localization operation using the event data to determine location data representing the event in the sensory environment: and means for performing a labeling operation using the event data to determine one or more label representing the event: means for determining, based on a set of criteria, whether to perform a prioritization action related to the event data: and responsive to determining to perform a prioritization action, means for performing one or more prioritization action including causing prioritized output, by one or more sensory feedback devices of a user device, of sensory feedback in at least one sensory dimension based on the event data, the location data, and the one or more label.

Certain embodiments may provide one or more of the following technical advantage(s). Improvement to the human-machine interface can be achieved based on the (e.g., real-time) identification, location, and labeling of sensory stimuli in an end user's environment (representation of sound or vibration/force as visual object in screenspace). Improvement to the human-machine interface can be achieved based on the (e.g., real-time) identification, location, and labeling of sensory stimuli as labels corresponding to sensory feedback indicating intensity, distance away, or other potentially relevant features of the stimulus. The real-time use of located audio, visual, or other sensory feedback to prioritize the rendering of an XR environment, including informational overlays can provide the technical advantage of improving the efficiency and use of computing resources (e.g., bandwidth, processing power). Improvement to the human-machine interface can be achieved based on the use of sensory prompting to get individuals to attend to the stimulus that is prioritized. Improvement to the human-machine interface can be achieved based on the selective rendering of content based on sensory cues (visual cues, audio cues, or otherwise) that can prioritize based on upcoming experiences.

BRIEF DESCRIPTION OF THE DRAWINGS

FIG. 3 an exemplary index string for a packet that includes environmental data in accordance with some embodiments.

DETAILED DESCRIPTION

Figure 1:
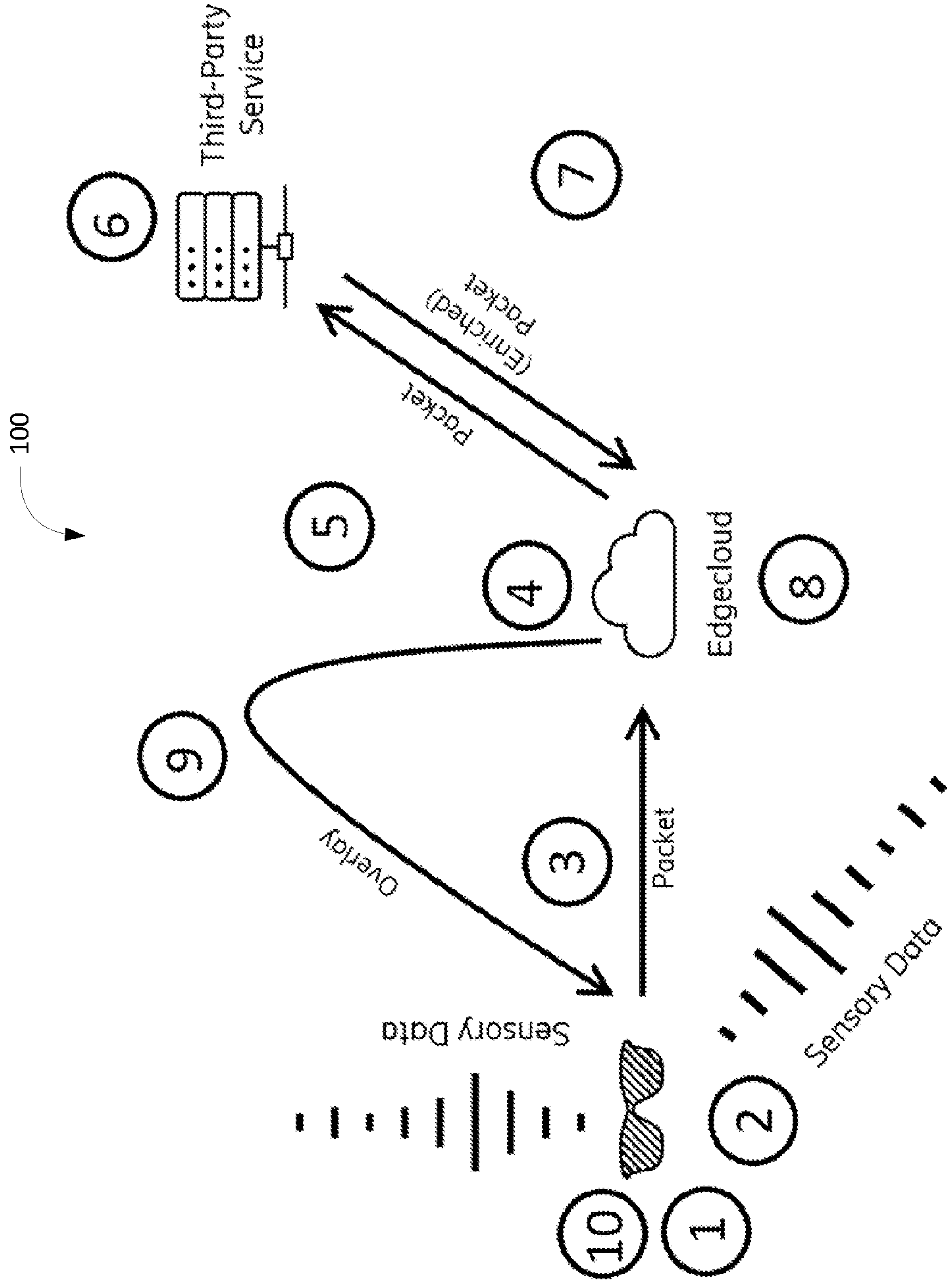
FIG. 1 illustrates an exemplary system and network process flow in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As an initial matter, several terms and concepts are described in more detail below to aid the reader in understanding the content of this disclosure.

AUGMENTED REALITY—Augmented reality (AR) augments the real world and its physical objects by overlaying virtual content. This virtual content is often produced digitally and incorporates sound, graphics, and video (and potentially other sensory output). For instance, a shopper wearing augmented reality glasses while shopping in a supermarket might see nutritional information for each object as they place it in their shopping carpet. The glasses augment reality with information.

VIRTUAL REALITY—Virtual reality (VR) uses digital technology to create an entirely simulated environment. Unlike AR—which augments reality—VR is intended to immerse users inside an entirely simulated experience. In a fully VR experience, all visuals and sounds are produced digitally and does not have any input from the user's actual physical environment. For instance, VR is increasingly integrated into manufacturing, whereby trainees practice building machinery before starting on the line.

MIXED REALITY—Mixed reality (MR) combines elements of both AR and VR. In the same vein as AR, MR environments overlay digital effects on top of the user's physical environment. However, MR integrates additional, richer information about the user's physical environment such as depth, dimensionality, and surface textures. In MR environments, the end user experience therefore more closely resembles the real world. To concretize this, consider two users hitting a MR tennis ball in on a real-world tennis court. MR will incorporate information about the hardness of the surface (grass versus clay), the direction and force the racket struck the ball, and the player's height. Note that augmented reality and mixed reality are often used to refer the same idea. In this document, the word "augmented reality" also refers to the mixed reality.

EXTENDED REALITY—Extended reality (XR) is an umbrella term referring to all real-and-virtual combined environments, such as AR, VR and MR. Therefore XR provides a wide variety and vast number of levels in the reality-virtuality continuum of the perceived environment, bringing AR, VR, MR and other types of environments (e.g., augmented virtuality, mediated reality, etc) under one term.

XR DEVICE—The device which will be used as an interface for the user to perceive both virtual and/or real content in the context of extended reality. Such device will typically have a display (which could be opaque, such as a screen) or display both the environment (real or virtual) and virtual content together (video see-through), or overlay virtual content through a semi-transparent display (optical see-through). The XR device would need to acquire information about the environment through the use of sensors (typically cameras and inertial sensors) to map the environment while simultaneously keeping track of the device's location within it.

OBJECT RECOGNITION IN EXTENDED REALITY—Object recognition in extended reality is mostly used to detect real world objects as for triggering the digital content. For example, the consumer would look at a fashion magazine with augmented reality glasses and a video of a catwalk event would play in a video instantly. Note that sound, smell and touch are also considered objects subject to object recognition. For example, a diaper ad could be displayed as the sound and perhaps the mood of a crying baby is detected (mood could be detected from ML of sound data).

SCREENSPACE—The end user's field of vision through an XR headset.

The disclosure in Section A below introduces an exemplary architecture that can support encoding data from one sense (e.g., smell), estimating its location and plausible navigation details, and translating this information to another type of sensory information (e.g., audio). This mapped data can then be used for purposes of generating overlays, haptic feedback, or other sensory responses potentially on a sensory dimension in which it was not originally recorded. The disclosure below in Section B also introduces the concept of using these updates to prioritize the rendering of graphics and other feedback types in the edgecloud or on the headset. This can enable environmental changes in either highly dynamic or critical moments (e.g., prioritizing rendering in presence of noxious smells or intense audio) above background environmental understanding processes or general spatial mapping. The architecture introduced in Section 5B can enable the prioritization of XR rendering based on sensory conditions in the environment.

Section A

A.1. Process Diagram

A.1.1. Single Device Diagram

FIG. 1 illustrates an exemplary network flow 100 for an XR headset or device to use the network to push packets containing sensory data into the edgecloud (3). First, the headset turns on and connects to the network (1). It then gathers sensory data and includes them in a packet (2). The device then uses the network to push the packet to the edgecloud (3). Once in the edgecloud, the shared packets are aggregated into a single payload (4). This packet can then be used to calculate an overlay (8) or (optionally) shared with a third-party service (5) for further enrichment. The third-party service then (optionally) augments the data or information from the packet(s) (6) and returns it to the edgecloud (7). The overlay is then returned to the headset (9) and displayed or otherwise outputted (10). These steps are described in more detail below.

As shown in FIG. 1, at step 1, an end user initializes their headset (also referred to as a user device or UE), preferred program utilizing LLR, and specifies their sensory locating, labeling, and rendering preferences. The specific user interface governing these selections is beyond the scope of this disclosure. At step 2, the UE detects, identifies, and locates sensory data fitting the end user's preference criteria (and/or relevant and significant according to some other criteria). At step 3, if processing cannot optimally be performed on the device, data is sent to the edgecloud to process location, dimensionality, and other relevant features of sensory data in the end user's environment. At step 4, relevant data is processed in the edgecloud, if needed. At step, 5 if applicable, data is (optionally) sent to third parties specializing in the identification, labeling, or description of particular sensory data—such as a fire safety repository capable of identifying likely sources of smoke or noxious gases. Such third parties may also contain libraries of sensory information upon which machine learning recognition algorithms may be trained to recognize particular stimuli. At step, 6 additional processing is done and/or permissions are acquired in third party edge as/if needed. At step, 7 the relevant data returns to edge for post-request and post-processing. At step, 8 the edgecloud generates an overlay data matrix to store, label, and locate potentially dynamic location- and sensory-specific information in the end user's environment. This may be done on the device, given the computational power, or in the edgecloud. We depict the latter. At step, 9 the UE receives this overlay and places it to correspond to the nearest approximation of the captured sensory stimulation in the end user's environment—updating the overlay at time interval t, as described in section A.3.2. At step, 10 the UE may link this overlay to a spatial map and share this data with other devices through a shared network connection (with the appropriate permissions). As an optionally and additional, end users may configure LLR to third party applications. As an optionally and additional, end users may share LLR settings, data, and preferences with other end users via a trusted network connection.

A.1.2. Multiple Device Diagram

This section describes a network flow to allow multiple sensors to contribute sensory data for purposes of generating an overlay. Each packet is indexed by a unique alphanumeric string (described in Section A.2). This architecture allows multiple devices or sensors to pool data for either more precise localization of the sense or to generate more extensive overlays. Using the network to pool data from multiple sensors in contrast to Section A.1.1, where only data from the device generating or receiving the overlay is used.

Figure 2:
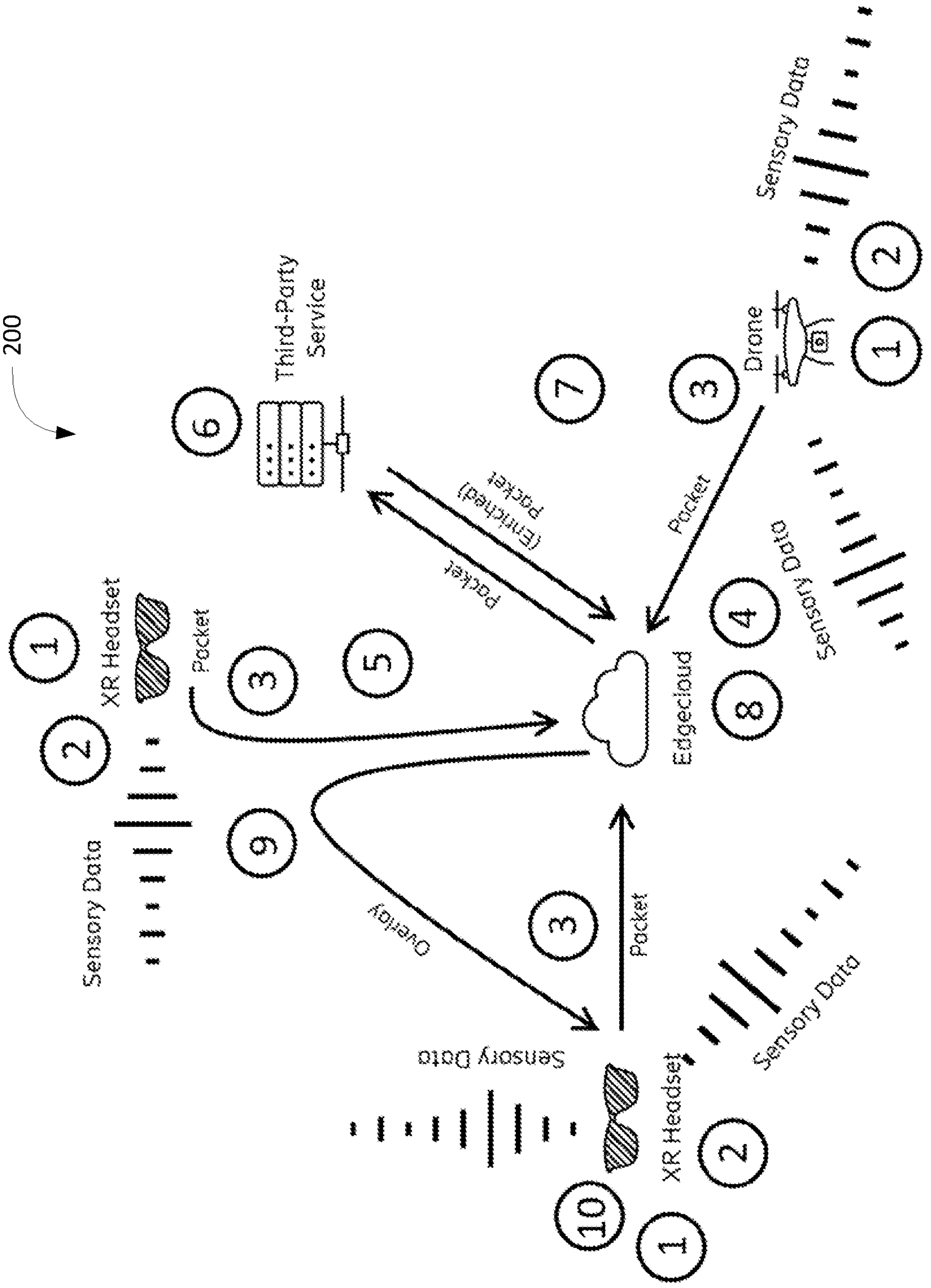
FIG. 2 illustrates an exemplary system and network process flow in accordance with some embodiments.

FIG. 2 illustrates a standard network flow 200 for an XR headset or device to use the network to push packets containing sensory data into the edgecloud with multiple devices.

This process is quite like the one laid out above in section A.1.1, but includes multiple devices detecting sensory stimuli, locating them, labeling them, and potentially prioritizing their rendering in the end user's environment (see section B). First, the headset and other sensors turn on and connect to the network (1). They then gather sensory data and include them into one or more packet (2) (e.g., either one of the devices/sensors gathers the data and sends together, or each can send separately to the edgecloud). The devices then use the network to push the packets to the edgecloud (3). Once in the edgecloud, the packets shared in are aggregated into a single payload (4). This can then be used to calculate an overlay (8) or (optionally) shared with a third-party service (5) for further enrichment. The third-party service then augments the packet (6) and returns it to the edgecloud (7). The overlay is then returned to the headset (9) and displayed (10).

A.2. Data Format & Indexing

This section describes a generic network packet header that indexes the payload that contains the environmental and sensory data the headset or sensor recorded. The header is an alphanumeric string that allows the edgecloud or user equipment (UE) to uniquely identify the originating device, the geospatial location where the data were recorded, and the data type (e.g., audio, video, etc.). This field is used to index the packets related to locating, labeling, and rendering sensory information.

FIG. 3 illustrates an example index string 300 for a packet containing environmental data transmitted over the network or processed on the UE. The first 17 alphanumeric characters are a UE identification number that uniquely identifies the UE. While the way in which XR devices will be persistently identified are still under development, example identifiers include the e-SIM numbers, IMEIs, or UUIDs. The next six digits are the hour, minute, and second when the packet was generated. The next sixteen-digit long field is the latitude and longitude where the device was located when it generated the packet. These are obtained via the device's built-in GPS sensor or from mobile network localization. The next four digits are optional and are the altitude (e.g., the position along the Z-axis) where the device was located when it generated the packet. This is obtained via a built-in altimeter. The subsequent three digits indicate the data type (e.g., audio, video, etc.) in the payload. The final four digits are a checksum used to validate the packet. In this case, the resulting packet header is 0ABCD12EFGHI34578202101130000010100000101000001000010010001. One of skill would appreciate that variations on the index string can be made for serving the same purpose and thus still be within the intended scope of this disclosure.

A.3. Overlay Generation and Composition

A.3.1. Sensory Detection

In order for the LLR mechanism to locate, label, and potentially prioritize the rendering of areas around designated sensory stimuli, it must detect these stimuli. This necessitates one or more sensors that are capable of detecting the variety of sensory stimuli upon which an end user wishes to deploy this mechanism. In this section, the authors first provide a brief overview of the types of sensors that would be compatible with such a system on one device before briefly discussing the expanded sensory detection capabilities of including multiple devices in the LLR's detection array.

A.3.1.1. Single-Device Detection Apparatus

A single-device sensory detection apparatus functions with the devices available on the UE alongside any devices paired with it. A number of technologies exist to detect sensory stimuli in an end user's environment. In the interest of illustration by example, we provide a series of examples of sensory detection technologies that may be employed to detect sensory stimuli in an end user's environment: LIDAR array: Conventional camera technology (e.g., stereo camera technology): Conventional audio sensor technology: SONAR detection technology: Optical gas sensor technology: Electrochemical gas sensor technology: Acoustic based gas sensor; Olfactometer technology. Note that this list is not exhaustive, but rather illustrative of the types of technologies capable with sensory detection in the LLR architecture.

A.3.1.2. Multi-Device Detection Apparatus

The LLR architecture allows multiple devices to share descriptive, locational, and spatial data on sensory stimuli in their environments with the UE operating the LLR mechanism locally. Under this manifestation, data is shared via an appropriate low-latency network either 1) directly with the UE, or 2) when appropriate, through the edgecloud with the proper two-way permissions necessitating the exchange of information between both devices. An exemplary process is described in A.1.2. in the above.

A.3.2 Overlay composition

In some embodiments, an XR user device (e.g., UE)—potentially in conjunction with computational resources in the edgecloud—displays or otherwise outputs a generated overlay that captures and represents designated sensory stimuli in a predefined proximity to the end user. This proximity may be determined by the sensor limitations of the UE and paired devices, or by end user preferences set within an interface that is beyond the scope of this disclosure. Below is a description of an exemplary composition of this overlay.

Upon detection of sensory stimulus identified by an end user to be located and labeled by the LLR mechanism, the UE generates a dynamic data overlay comprised of three-dimensional units p, where p represents the optimal unit size to capture the sensory stimulation of the type detected. Each unit p corresponds to a spatial coordinate (x,y,z), where x, y and z correspond to the physical location of that unit in positional physical space in the end user's environment. This overlay updates information stored within each positional unit at a given time interval t.

Each unit ρ corresponds to a data cell populated with information relevant to the location, labeling, and (potentially) rendering of this environment at time t (see Section B below). While the full range of information contained within each cell of this overlay is beyond the scope of this disclosure, we propose the following information as potential minimum necessary indicators: Coordinates (x,y,z); Sensory stimulus detection type(s); Sensory stimulation measurement(s) (e.g., intensity, features, or any other relevant data).

A.3.3. Locating sensory data in XR environment

Once the UE has fit an overlay on the detected sensory stimulus, the UE must locate this area in relation to the end user. To do this, the UE estimates the distance (and (optionally) orientation and other pose information relative to the UE) from the end user's position to the overlaid area. Estimating distance using common visual sensors fit onto cameras is in line with the existing state of the art of UE in XR technologies.

Once the UE has fit an overlay of the sensory stimulus, there are several ways that it may estimate this distance using existing art. For example, the UE may use, as its anchor point, the centroid position of the UE itself and the centroid position of the stimulus. Doing so would provide an "average distance" measure that would approximate the distance between the central positions of the UE and the sensory stimulus area. As another example, the UE may use a predefined feature of the end user and a predefined target area of specific types of stimulus as anchor points between which to measure distance. This measure would provide a more customizable experience through which end users defined distance by type of stimulation. The configuration of this variety of measure is beyond the scope of this disclosure. However, if the overlaid area represents a potential harm to the end user, these measures of distance may be impractical and lead to the end user endangering themselves. We therefore specifically identify a third exemplary method of measuring distance from the edges of the estimated end user's bodily space to the edge of the overlaid area. More specifically, we propose that in situations of harm detection and reduction, distance be measured from the edgepoint of the end user's defined space and the edgepoint of the overlaid area that minimized the unobstructed distance between the two areas. This would provide the minimum distance at which the end user would likely be endangered by the stimulus.

Note that although these examples of locating methods as a template for usability are provided above, the exact method of determining distance will vary based on the capabilities of the UE and is beyond the scope of this disclosure.

A.3.4. Labeling sensory stimulus in XR environment

A critical innovation of this proposed invention beyond identifying and locating sensory stimuli in an end user's environment is the near-real-time labeling of sensory stimulus outside of an end user's perception. The prospect of labeling objects in a sensory (e.g., 3D virtual reality) environment represents the art in the application of machine learning methods to environmental understanding in extended reality. While the techniques described herein are agnostic to the specific method used to generate labels, authors propose that any such mechanism be compatible with the thriving array of machine learning technologies made available with low latency in near-real-time through access to edgecloud resources through 5G NR and equivalent networks.

Once the UE has identified a sensory stimulus and fit an overlay capturing its dimensionality and location, the UE may use computational resources on the device or in the edgecloud to label this stimulus (e.g., in a visual overlay output). Examples of labels that can be compatible with this system:

- Semantic labels: labels that project recognition context through the visual, audio, or tactile production of words communicating the type of stimulus located.
- Proximity labels: labels that indicate the proximity (and (optionally) other pose information such as orientation) of particular stimuli in an end user's environment. This may include arrows indicating the direction of detected stimulus in an end user's environment along with representations (audio, visual, or tactile) of the distance or proximity of the detection.
- Magnitude/intensity labels: labels that indicate the magnitude of intensity of the sensory stimuli identified. This may include an increasing or decreasing pattern of lights, sounds, or haptic feedback proportional to the magnitude or intensity of the stimulus.

The label affixed to a stimulus can vary based on the preferences of the end user. In accordance with some embodiments, end users may designate preferences for:

- The specific types of stimuli to be alerted to, such as obstructions within a certain distance, in a particular direction.
- The magnitude thresholds for sensory stimuli to be labeled, such as labeling physical obstructions above or below a particular estimated height.
- The types of labels to affix to stimulus, ranging from the medium of the label, such as an audio label alerting an end user with relevant details of the stimuli, visual label displayed in screenspace, or haptic label corresponding to increasing degrees of haptic feedback when within a pre-defined proximity.

The capability of the UE may also determine the ability to affix labels to sensory stimulus in an end user's environment (or beyond).

A.4. Example Data

This section gives examples of data contained in a payload. The data are represented as XML objects, but they could be represented as JSON or other formats. In the below example, the data sample come a room where the ambient temperature is 31 degrees centigrade, the absolute humidity is 30%, and the noise level is 120 decibels. Note that the data below are non-exhaustive in terms of content.

A.4.1 Temperature

```
<message from='device@example.org'
  to='client@example.org/amr'>
  <fields xmlns='urn:xmpp:iot:sensordata' seqnr='1' done='true'>
    <node nodeId='Device01'>
      <timestamp value='2019-03-07T16:24:30'>
        <numeric name='temperature' momentary='true'
automaticReadout='true' value='31' unit='centigrade'/>
          <xyz.location='000 111 222'>
      </timestamp>
    </node>
  </fields>
</message>
```

A.4.2. Humidity

```
<message from='device@example.org'
  to='client@example.org/amr'>
  <fields xmlns='urn:xmpp:iot:sensordata' seqnr='1' done='true'>
    <node nodeId='Device01'>
      <timestamp value='2019-03-07T16:24:30'>
        <numeric name='humidity' momentary='true'
automaticReadout='true' value='30' unit='absoluteHumidity'/>
          <xyz.location='000 111 222'>
      </timestamp>
    </node>
  </fields>
</message>
```

A.4.3. Noise level

```
<message from='device@example.org'
  to='client@example.org/amr'>
  <fields xmlns='urn:xmpp:iot:sensordata' seqnr='1' done='true'>
    <node nodeId='Device01'>
      <timestamp value='2019-03-07T16:24:30'>
        <numeric name='sound' momentary='true'
automaticReadout='true' value='120' unit='decibels'/>
          <xyz.location='000 111 222'>
      </timestamp>
    </node>
  </fields>
</message>
```

Section B

B.1 Prioritizing rendering of XR environment around detected sensory stimulus

XR applications are computationally expensive and require massive bandwidth due to the transmission and processing of video, audio, spatial data etc. On the other hand, the user experience is directly related to the latency of the XR application. Since bandwidth and computation resources are limited, one way to sustain the user experience within a satisfactory range is to prioritize where computation and bandwidth should be spent first.

Existing solutions typically address the user's direct field of view, as captured by the front-facing camera and potentially supported by user gaze, to prioritize transmission (to cloud server) and processing in the cloud server or natively in the device. In some head mounted devices, certain size margins around user's field of view is also rendered before user turn his/her head (to mitigate motion sickness). The techniques proposed herein introduce a different prioritization scheme wherein points in the space where important events (e.g., activities or occurrences of interest) are occurring, regardless of being within or out of user's field of view, will be given higher priority for transmission (to cloud server) and/or processing in the device/cloud.

B.1.1. Prioritization and sensory-based detection

The notion of importance can vary depending on what matters most for a given user at a given time (e.g. a user with poor driving skill is looking for a parking space in the morning), what matters in general for the majority of users (e.g. a vehicle with high speed is driving in the vicinity) and the importance with respect to a given context (e.g., user situated in a crowded city center, or driving at a poor weather condition). The idea is to first detect the presence of such important events (e.g., activities/scenes) using existing high speed sensory/perception equipment at user's disposal (such as voice directivity detection, motion detection and tracking, etc.) or any alternative means provided as part of city infrastructure (such as visual camera sensors available across a city center).

The events (e.g., activities/scenes) of importance do not need to be situated in the user's direct field of view. They may occur out of field of view of the user but could be captured using side/backward facing (motion detection) cameras or using an array of sound receivers installed in the head mounted device which can determine the direction, density and intensity of the ambient voice. This information is then used to assign spatial priorities to the user's surrounding space. The spatial priorities determine the allocation of transmission and processing resources. For example, if the highest priority event is occurring at a point (x, y, z) relative to the user, the data packets corresponding to (x, y, z) will be transmitted before other packets conveying information of other low priority points (x', y', z'). For a differentiated processing (e.g. at the edgecloud or cloud server), the packets are tagged with priority values at the sender. The receiver (e.g., cloud server) uses the priority values to prioritize the processing of the packets. After processing, which may lead to rendered/augmented video/audio/etc. or haptic feedback are, in general, sent back to the user with similar priorities as the original packets.

B.2. Example Algorithm

The following example assumes a user with head mounted device equipped with cameras and an array of separated sound receivers also installed in the head mounted device (or endowed by another nearby device(s)). The following exemplary steps describes how the information perceived by the voice receiver array is used to prioritize the resource allocation for data transmission from the device and computation in the edge.

At step 1, ambient voice is received at individual voice receivers. At step 2, the different voices are separated and classified (car, person, etc.). At step 3, the direction, intensity (and preferably the distance from source) of individual classes of voice sources are determined by the array of voice receivers. At step 4, a priority value is assigned to each voice source. The priority value is determined by user preference (and other characteristics such as vision disorder), the characteristics of the voice itself (source class, distance, intensity, direction) and other contextual information if available. At step 5, the points in the mapped 3D space around the user is updated with the new information from step 4 to create a 3D spatial priority map. Every point (x, y, z) or a continuous block of such points (e.g., voxels) are tagged with the acquired information in step 4. At step 6, the cameras in the HMD (head mounted device, a UE) captures the point in space with respect to the order of priorities. At step 7, the camera streams are packetized and tagged with the priority value obtained from the 3D spatial priority map. At step 8, the packets with high priorities are accordingly queued in a single queue for transmission, or multiple priority queues depending on whichever is available at the device. At step 9, at the receiver (edgecloud), the packets are collected, packet priorities are inspected and assigned to processing queues(s) according to the priority values. At step 10, the processed information, if leads to any feedback in terms of rendered video/image with augmented digital objects, haptic feedback or other types of sensory feedback is sent back to the device based on the original priorities assigned to the source packets. At step 11, the logic in the device on how to consume the information from the edge can also be based on the 3D spatial priority maintained at the device.

Section C

Presented below are several example embodiments that may employ the LLR mechanism described above in one or more of Sections A and B.

C.1 Locating, Labeling, and Rendering sensory threats in real time in hazardous conditions The LLR mechanism can be used to visualize, locate, and label sensory threats in hazardous conditions that end users could potentially face in the workplace. In an industrial context, workers operating in hazardous conditions in contexts that rely on proximity alerts or alarms to alert them to danger may face conditions that impair their ability to perceive threats in their local environment. Thus, workers engaged in a complex task and working with equipment that limits their mobility or perception may not be aware of flashing lights, loud music, or other individuals warning them of an impending hazard.

The LLR mechanism allows such workers to set preferences identifying either general or specific sensory hazards (also referred to as events)—flashing lights, noxious gas traces, or noises above a preset threshold—and then cue the UE to locate, label, and prioritize the processing and rendering the relevant environmental information associated with that stimulus. Thus, a worker distracted by a complex portion of the assembly of an intricate machinery part may be alerted via a haptic and/or audio alert to noxious gas in their proximity, with an arrow outline appearing in their screenspace alerting them to the estimated direction of that noxious gas. The LLR mechanism may then prioritize the rendering of environmental information from paired or network-connected sensors from the area in which the detected hazard resides.

Such a mechanism may, in fact, take advantage of a whole host of connected sensors via a workplace's camera, noxious gas, and proximity alarm arrays through network or short-link connections. Such an ecosystem may make industrial workplaces safer by several orders of magnitude by integrating extended reality technologies into their personal security infrastructure.

Figure 4:
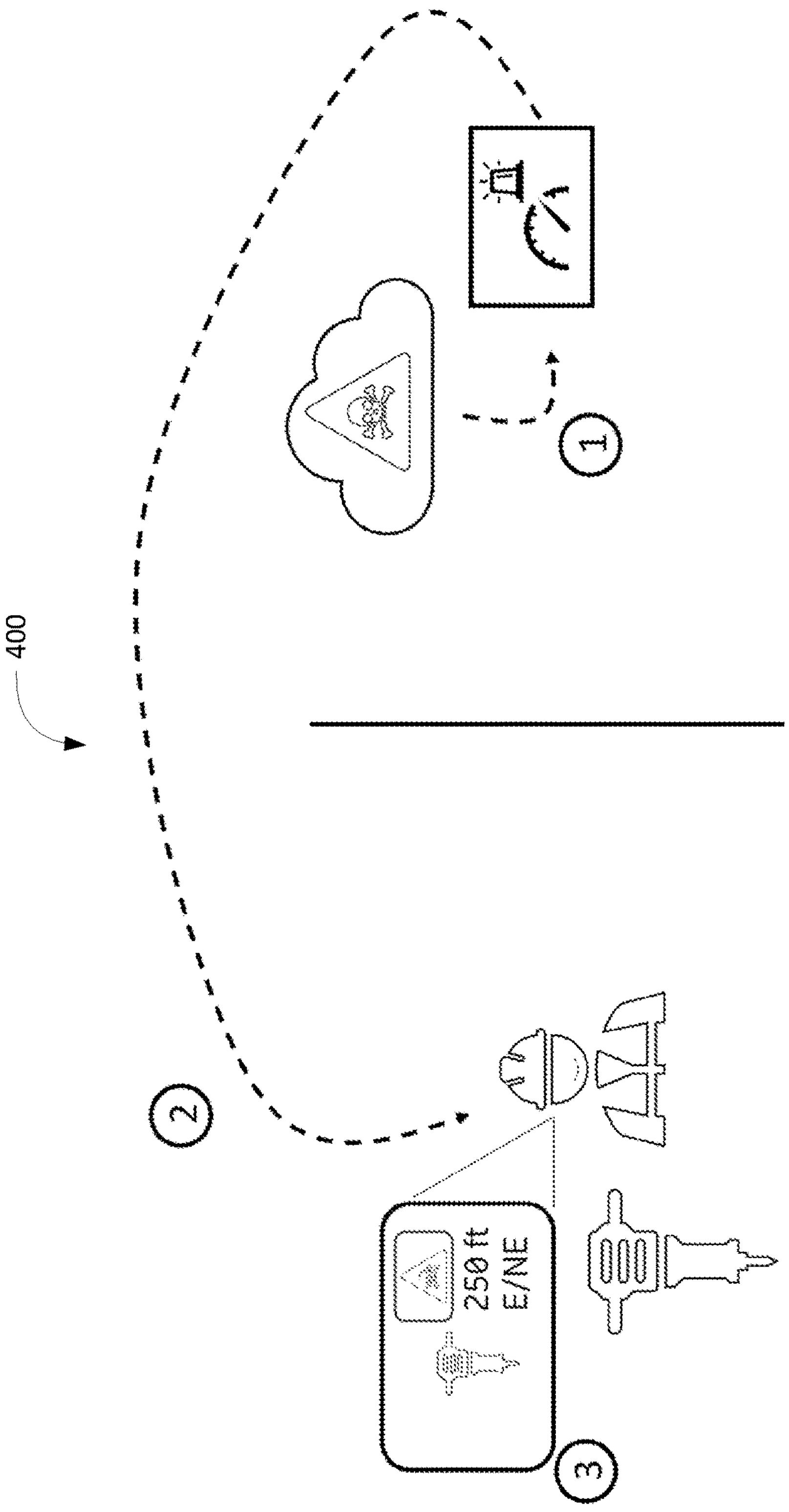
FIG. 4 illustrates an exemplary use case diagram in accordance with some embodiments.

FIG. 4 illustrates an exemplary workplace use case scenario 400 for the LLR. In this example, a construction worker engaged in a loud task is unaware of a toxic gas leak occurring near them in an area out of their line of sight and obstructed by an obstacle. A network-connected gas sensor detects the presence of toxic gas (1). The sensor then pushes its location information and the estimated location of the toxic gas in (2). The LLR uses this information to construct a visual label on the construction worker's network connected headset (or smart glass), per the end user's preference designation, alerting them of the location of the gas detection in their environment—identifying the hazard as toxic gas and providing them with the estimated distance and direction of the gas hazard (3).

C.2. Alternative representation of hazardous obstacles in real time for sensory impaired end users The LLR mechanism may also be used by individuals with sensory impairments to locate, label, and navigate around hazardous obstacles in real time. As an example of this, consider end users with visual impairments. These users may configure the LLR to represent obstacles in their navigating paths with haptics that increase in intensity as the end user approaches the proximity of the obstacle hazard. They may choose to represent hazards with different configurations of audio or haptic feedback, and may select navigation options that move them safely away from the obstacle in conjunction with a third-party application that connects to a spatial map service.

Such an end user may also use the LLR to prioritize the rendering of contextual information around such an obstacle, which may then be pushed to a third-party service that could share this information on a spatial map with other end users to avoid the same obstacle.

Figure 5:
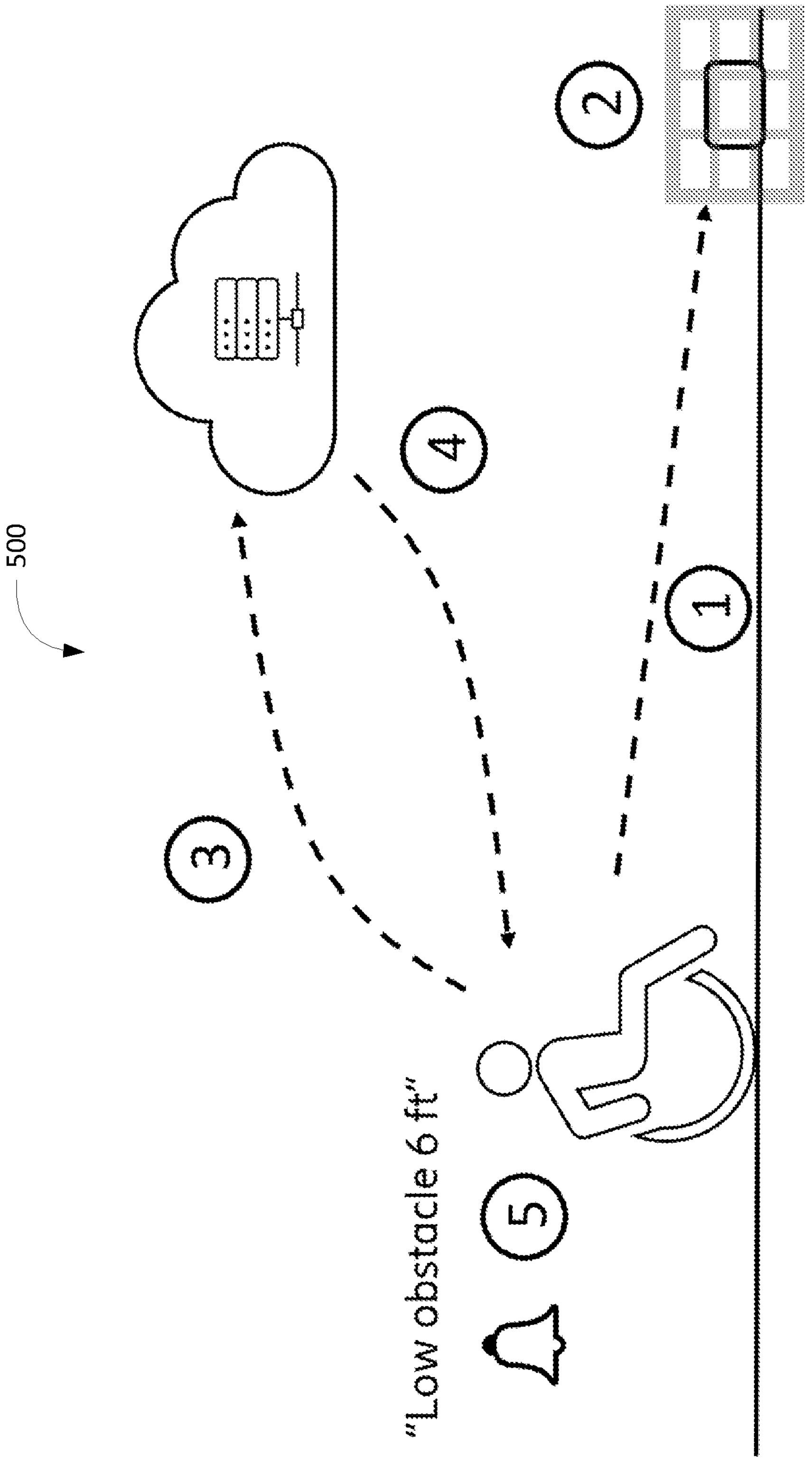
FIG. 5 illustrates an exemplary use case diagram in accordance with some embodiments.

FIG. 5 illustrates an exemplary use case scenario 500 for using the LLR mechanism as an adaptive technology for disabled users. In this illustration, a visually impaired person using a wheelchair and wearing an LLR-equipped UE is about to encounter an obstacle (a type of event) along their route. The LLR identifies this obstacle according to the preset designations for locating potentially hazardous objects (1). The LLR then fits an overlay identifying the salient features of the obstacle area, including (but not limited to) its estimated distance, dimensions, and (potentially) its classification according to some pre-defined categories (2). If necessary, the UE will push a request to the edgecloud to correctly identify the object or extrapolate information about the object based on the data acquired (3). If this is initiated, the edgecloud returns requested responses post-processing (4), at which time the end user's UE labels the object "low obstacle" in accordance with preset configurations before notifying them that the object is six feet away via an audio message (5). This alert may also come with a haptic response that updates to tap the end user with increasing frequency or intensity as the end user gets closer to the obstacle.

C.3. Environmental safety

Environmental hazard safety is one of this invention's potential embodiments. Many sensors for hazards—including Geiger counters, fire alarms, CO2 monitors, and temperature gauges—are designed to provide alerts using one specific type sensory feedback. For instance, Geiger counters emit clicks whose frequency per second indicate the amount of radiation in the environment. By mapping sensory information from one sense (in this case audio) to another, this invention supports converting the frequency of clicks into an overlay in screenspace.

In a similar example based upon the multiple device architecture, firefighters' headsets could share ambient temperature information to generate a real-time and collaborative spatial map of a fire. These temperature data could then be used to generate visual overlays in screenspace or haptic alerts as firefighters approach danger zones.

Figure 6:
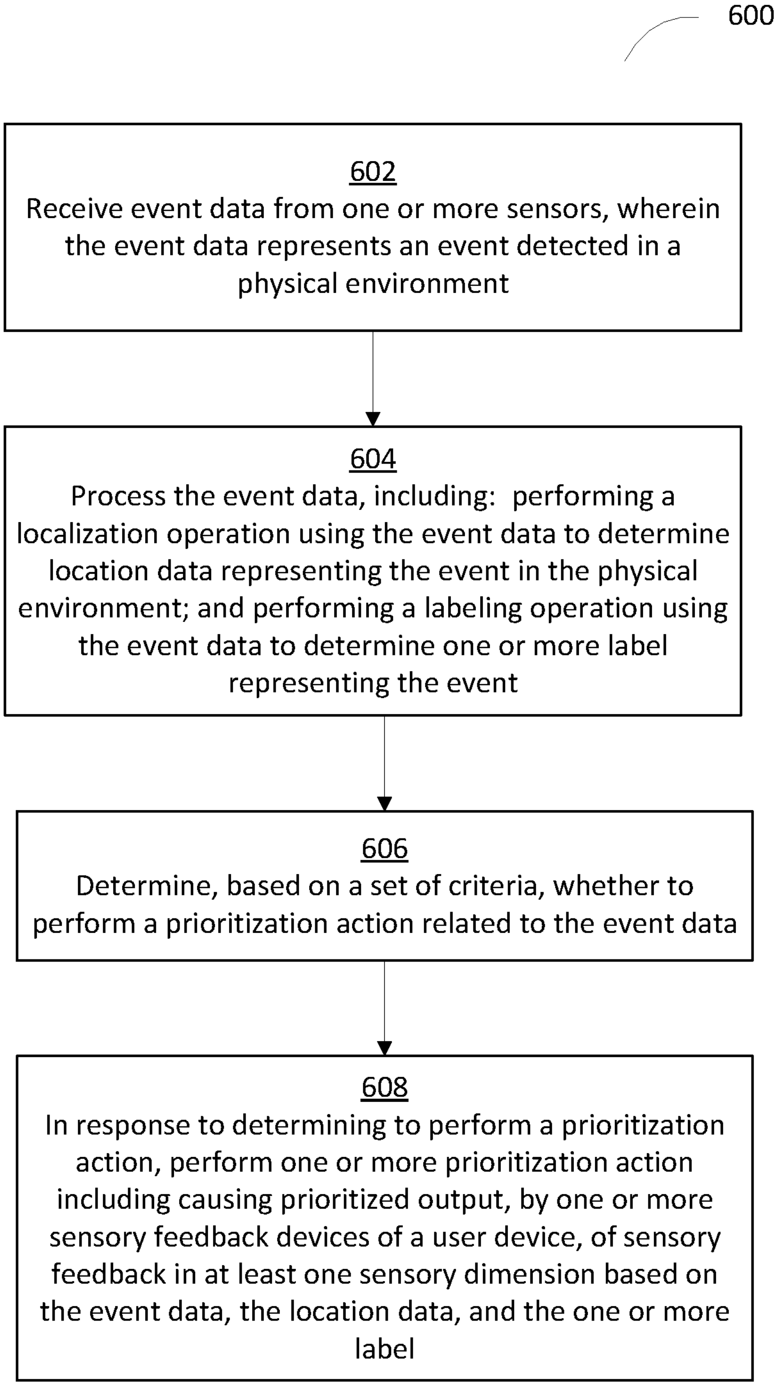
FIG. 6 illustrates an exemplary process in accordance with some embodiments.

FIG. 6 illustrates an exemplary process 600 for processing of event data (e.g., by a device such as a UE or edge node) for providing feedback in accordance with some embodiments. Process 600 can be performed by one or more system (e.g., of one or more devices) as described herein (e.g., 700, 810, 900, 1002, 860, 1008). The techniques and embodiments described with respect to process 600 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process.

A device (e.g., 700, 810, 900, 1002, 860, 1008) receives (block 602) event data from one or more sensors (e.g., attached, connected to, or part of the device (e.g., a user device); and/or remote from the device (e.g., an edgecloud/server device or system) that are in communication with or are connected to the device (e.g., user device and/or sensors are in communication with the edgecloud/server) or a common network node (e.g., that aggregates the sensor and UE data)), wherein the event data represents an event detected in a sensory environment (e.g., the environment around the user device). In some embodiments, the sensory environment is a physical environment (e.g., in which a user of a user device that outputs sensory output is located). In some embodiments, the sensory environment is a virtual environment (e.g., displayed to a user of a user device that outputs sensory output). For example, a detected event can be a detected environmental hazard (e.g., poisonous gas, dangerously approaching vehicle), and event data is sensor data representing the event (e.g., a gas sensor reading indicating gas detection, a series of images from a camera representing the approaching vehicle).

The device processes (block 604) the event data, including: performing a localization operation using the event data (e.g., and other data) to determine location data representing the event in the sensory environment: and performing a labeling operation using the event data to determine one or more label representing the event (e.g., the label identifying the event (e.g., threat or danger to the user) or some characteristic thereof, such as proximity to a user device, likelihood of collision with the user device, or other significance). For example, a label can be determined by the labeling operation, and optionally output (e.g., visually displayed if prioritized rendering is performed (e.g., displayed if event is significant), or visually displayed regardless of prioritized rendering (e.g., displayed even if event is not significant)). In some embodiments, performing a localization operation comprises causing an external localization resource to perform one or more localization processes. In some embodiments, performing a labeling operation comprises causing an external labeling resource to perform one or more labeling processes. For example, the edgecloude device can use a third-party resource (e.g., server) to perform one or more of the labeling and localization. In some embodiments, processing the event data includes receiving additional data from external resources. For example, the edgecloud can query an external third-party server for data to use in performing localization and/or labeling.

The device determines (block 606), based on a set of criteria (e.g., based on one or more of the event data, the location data, label data), whether to perform a prioritization action related to the event data (e.g., on the data, with the data).

In response to determining to perform a prioritization action, the device performs (block 608) one or more prioritization action including causing prioritized output, by one or more sensory feedback devices of a user device (e.g., the device performing the method, or a remote device), of sensory feedback in at least one sensory dimension (e.g., visual, audio, haptic, or other) based on the event data, the location data, and the one or more label (e.g., the user device performs the method and outputs the sensory feedback, or a server/edgecloud device causes the user device (e.g., UE) remotely to output the sensory feedback).

In some embodiments, in response to determining to forgo performing a prioritization action, the device forgoes performing the one or more prioritization action.

In some embodiments, the at least one sensory dimension includes one or more of visual sensory output, audio sensory output, haptic sensory output, olfactory sensory output, and gustatory sensory output. In some embodiments, the sensory feedback represents the location data and the one or more label to indicate presence of the event in the sensory environment (e.g., indicates a location of an environmental hazard, and identifies what the environmental hazard is).

In some embodiments, the at least one sensory dimension, of the sensory feedback, differs in type from a captured sensory dimension of the one or more sensors (e.g., the sensor is a microphone, and the sensory feedback is delivered as a visual overlay).

In some embodiments, the prioritized output of sensory feedback comprises output of sensory feedback that has been prioritized in one or more of the following ways: prioritized processing of the event data (e.g., placing the event data into a prioritized processing data queue: causing the event data to processed sooner in time than it would have had it not been prioritized and/or sooner in time relative to non-prioritized data that was received prior to the event data), prioritized transmission of communication related to the event data, and prioritized rendering of the sensory feedback in at least one sensory dimension.

In some embodiments, performing the one or more prioritization action includes prioritizing transmission of the event data (e.g., to a server, to a user device).

In some embodiments, prioritizing transmission of the event data comprises one or more of: (1) causing transmission of one or more communication packets associated with the event data prior to transmitting non-prioritized communication packets (e.g., that would have otherwise been transmitted ahead in time of the one or more communication packets if not for prioritization) (e.g., utilizing a priority packet queue); and (2) causing transmission of one or more communication packets using a faster transmission resource (e.g., more bandwidth, higher rate, faster protocol). For example, prioritizing can include placing communication packets associated with the event ahead of other packets in a priority transmission queue, assigning a higher priority level, or both.

In some embodiments, performing the prioritization action comprises prioritizing rendering of the sensory feedback.

In some embodiments, prioritizing rendering includes: enhancing the sensory feedback in at least one sensory dimension prior to the prioritized output of the sensory feedback (e.g., where the feedback is visual, audible, etc.) (e.g., relative to non-prioritized rendering and/or relative to surrounding visual space on an overlay that is not related to the event).

In some embodiments, enhancing the sensory feedback in at least one sensory dimension comprises rendering augmented sensory information (e.g., amplified event sound, highlighted visuals or increased visual resolution, or any other modification of sensory output of the event data that serves to increase the attention of a receiver of the sensory output to the event) or additional contextual information (e.g., a visual label, an audible speech warning), or both, for output at the user device.

In some embodiments, the sensory feedback is a visual overlay output on a display of the user device, wherein the event in the sensory environment occurred outside of a current field-of-view of the display of the user device, and wherein enhancing the sensory feedback in at least one sensory dimension comprises increasing the visual resolution of the sensory feedback relative to non-prioritized visual feedback that is outside the current field-of-view. For example, visual information for an event that occurs outside of a user's current field of view can be enhanced so that when the user turns their head to look at the event in the environment, a higher quality or resolution image or overlay (than otherwise would have, for example, due to foveated rendering) is ready to be displayed instantly and without delay to due to latency.

In some embodiments, performing the one or more prioritization action includes prioritizing processing of the event data, wherein prioritizing processing of the event data comprises one or more of: causing processing of one or more communication packets associated with the event data prior to occur out of turn; and causing processing of one or more communication packets to be added to a priority processing queue. For example, prioritizing processing can have the effect of causing the event data, or data related thereto, of being processed (e.g., labeled, localized, rendered) sooner in time than it otherwise would be (e.g., if it were not prioritized, or relative to non-prioritized data received at a similar time). This can include adding the corresponding data to a priority processing queue (e.g., in which data in the priority queue is processing used available resources in preference to or before a non-priority data queue), or otherwise overriding or jumping ahead in an queue in order to process the prioritized data first.

In some embodiments, processing the event data further includes: assigning a priority value to the event data (e.g., either by the user device, by the edgecloud/server, or both, based on one or more of the event data, location, labels, user preferences, information about the user (e.g., characteristics, such as impaired vision or hearing)). In some embodiments, the set of criteria includes the priority value.

In some embodiments, the priority value is included in a transmission of event data to a remote processing resource (e.g., to the edgecloud) or included in a received transmission of event data (e.g., from the user device). For example, if the device is the user device that outputs the sensory output, it can transmit the event data to the edgecloud. For example, if the device is the edgecloud, it can receive the transmission of the event data from the user device that outputs the sensory output.

In some embodiments, determining whether to perform a prioritization action includes determining whether to perform local priority processing of the event data based at least on one or more of local processing resources, remote processing resources, and a transmission latency between local and remote resources. In some embodiments, in accordance with a determination to perform the local priority processing of the event data, the device performs the prioritization action including determining, by the user device, the sensory feedback to output based on processing one or more of the event data, location data, and the one or more label. For example, the device is the user device and determines what sensory output to output based on processing the event. In this example, the user device decided to process the event locally (instead of transmitting data for an edgecloud server to process) due to urgency (e.g., the event presented an immediate hazard or high importance such that the round trip time it would take for edgecloud processing was determined to be unacceptable). In some embodiments, in accordance with a determination to not perform the local priority processing of the event data, the device receives instructions from a remote resource for causing the prioritized output of sensory feedback. For example, the user device determines that the round trip time for edgelcoud processing is acceptable, and transmits appropriate data for edgecloud processing of the event data and determination of the sensory output due to the event.

In some embodiments, the set of criteria includes one or more of: the event data, the location data, the one or more label, user preferences, and information about a user (e.g., characteristics, such as impaired vision or hearing).

In some embodiments, the device performing the process is the user device that outputs the sensory feedback (e.g., an XR headset user device) (e.g., 810, 900, 1002).

In some embodiments, the device performing the process is a network node (e.g., edgecloud node/server) (e.g., 860, 1008) in communication with the user device that outputs the sensory feedback (e.g., an XR headset user device) (e.g., 810, 900, 1002).

In some embodiments, the event in the sensory environment is a potential environmental hazard, in the sensory environment, to a user of the user device. For example, the environmental hazard is a hazard as described above, such as detected poisonous gas, an oncoming vehicle, or the like.

Figure 7:
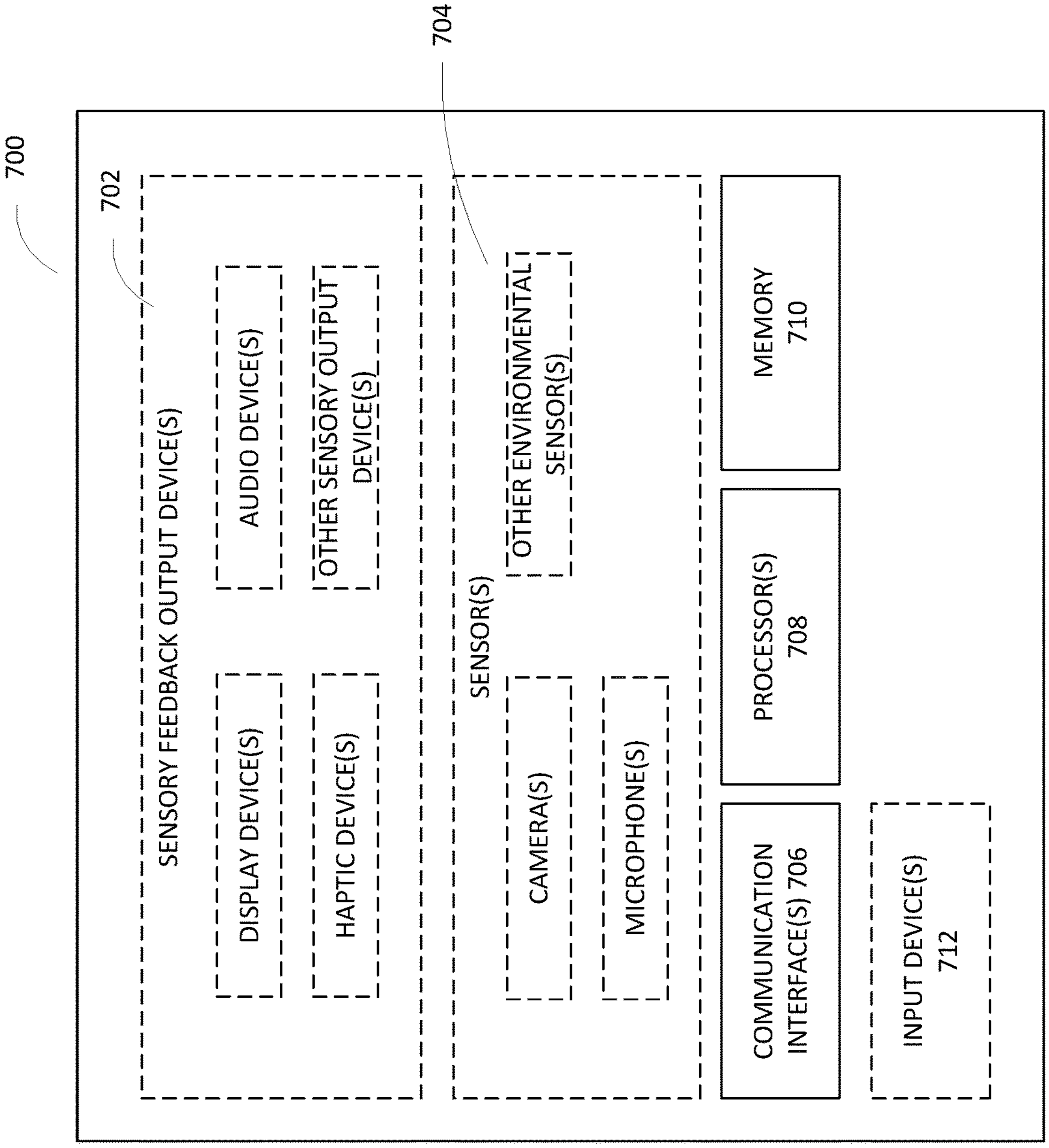
FIG. 7 illustrates an exemplary device in accordance with some embodiments.

FIG. 7 illustrates an exemplary device 700 in accordance with some embodiments. Device 700 can be used to implement the processes and embodiments described above, such as process 600. Device 700 can be a user device (e.g., a wearable XR headset user device). Device 700 can be an edgecloud server (e.g., in communication with a wearable XR headset user device and optionally one or more external sensors).

Device 700 optionally includes one or more sensory feedback output devices 702, including one or more display devices (e.g., display screens, image projection apparatuses, or the like), one or more haptic devices (e.g., devices for exerting physical force or tactile sensation on a user, such as vibration), one or more audio devices (e.g., a speaker for outputting audio feedback), and one or more other sensory output devices (e.g., olfactory sensory output device (for outputting smell feedback), gustatory sensory output device (for outputting taste feedback)). The list of sensory output devices that can be included in device 700 included here is not intended to be exhaustive, and any other appropriate sensory output devices that output sensory feedback that can be perceived by a user are intended to be within the scope of this disclosure.

Device 700 optionally includes one or more sensor devices 704 (also referred to as sensors), including one or more cameras (e.g., any optical or light detection-type sensor device for detecting images, light, or distance), one or more microphones (e.g., audio detection devices), and one or more other environmental sensors (e.g., gas detection sensor, gustatory sensor, olfactory sensor, haptic sensor). The list of sensor devices that can be included in device 700 included here is not intended to be exhaustive, and any other appropriate sensor devices that detect sensory feedback in at least one dimension are intended to be within the scope of this disclosure.

Device 700 includes one or more communication interface (e.g., hardware and any associated firmware/software for communicating via 3G LTE and/or 5G NR cellular interface, Wi-Fi (802.11), Bluetooth, or any other appropriate communication interface over a communication medium), one or more processors (e.g., for executing program instructions saved in memory), memory (e.g., random access memory, read-only memory, any appropriate memory for storing program instructions and/or data), and optionally one or more input devices (e.g., any device and/or associated interface for user input into device 700, such as a joystick, mouse, keyboard, glove, motion-sensitive controller, or the like).

In accordance with some embodiments, one or more of the components of device 700 can be included in any of devices 810, 900, 1002, 860, 1008 described herein. In accordance with some embodiments, one or more components of 700, 810, 900, 1002, 860, 1008 can be included in device 700. Devices described in like manner are intended to be interchangeable in the description herein, unless otherwise noted or not appropriate due to the context in which they are referred to.

Figure 8:
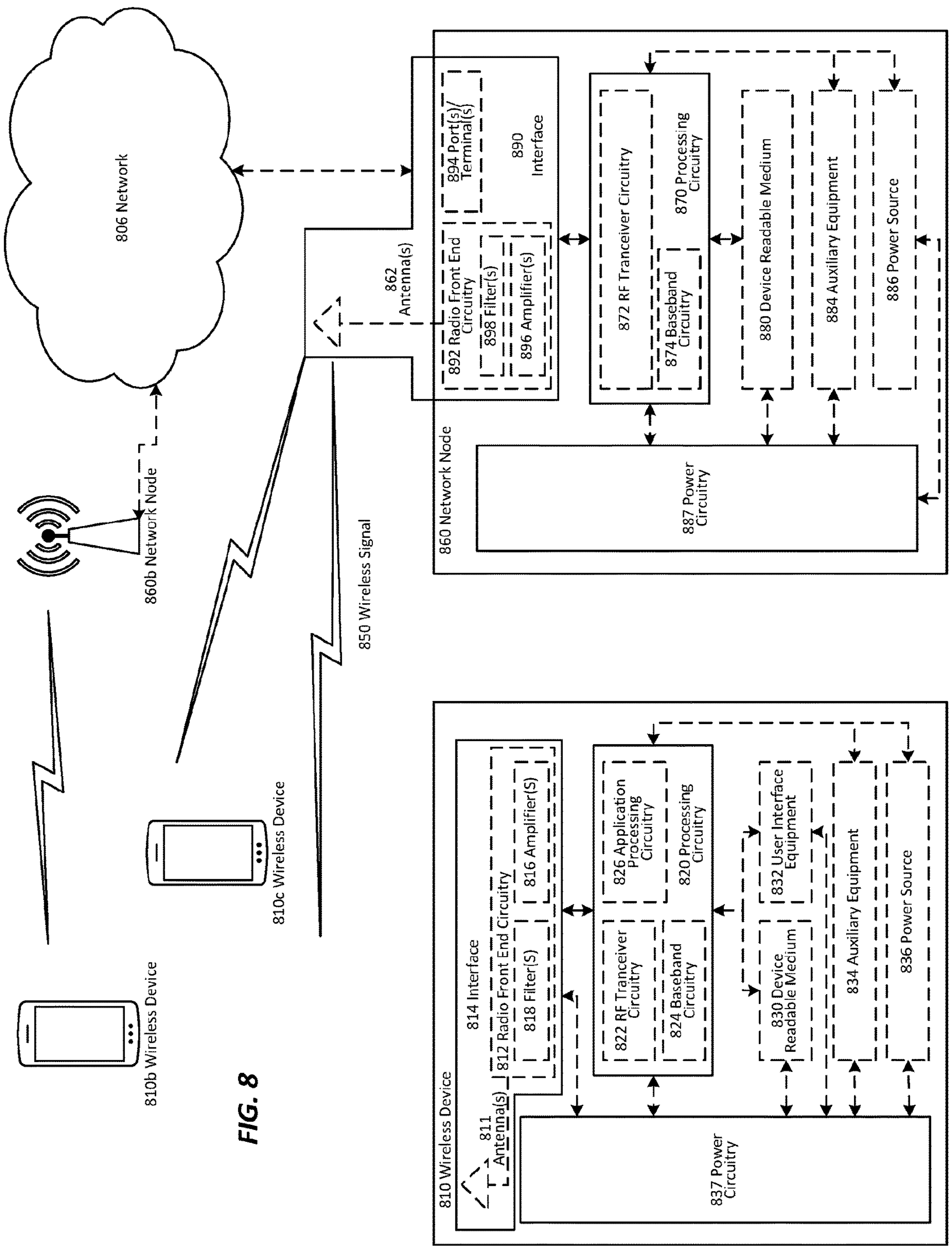
FIG. 8 illustrates an exemplary wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards: wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals 850. Antenna 862 may be coupled to radio front end circuitry 892 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals 850, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 812 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812: rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source: in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
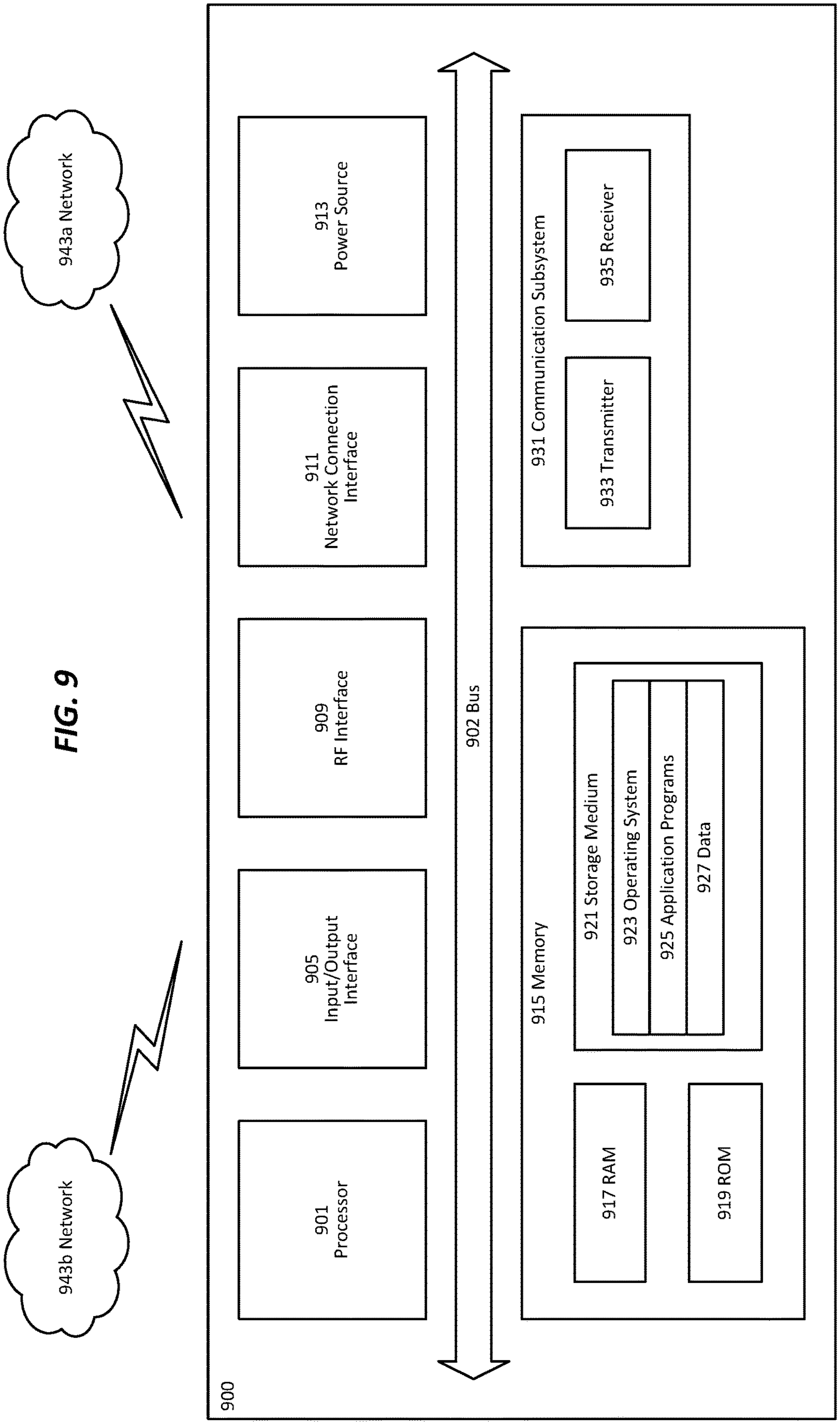
FIG. 9 illustrates an exemplary User Equipment (UE) in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3rd Generation Partnership Project (3GPP), including a NB-IOT UE, a machine type communication (MTC) UE, and/or an enhanced MTC (eMTC) UE. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 913, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware: one or more stored program, general-purpose processors, such as a microprocessor or Digital Signal Processor (DSP), together with appropriate software: or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
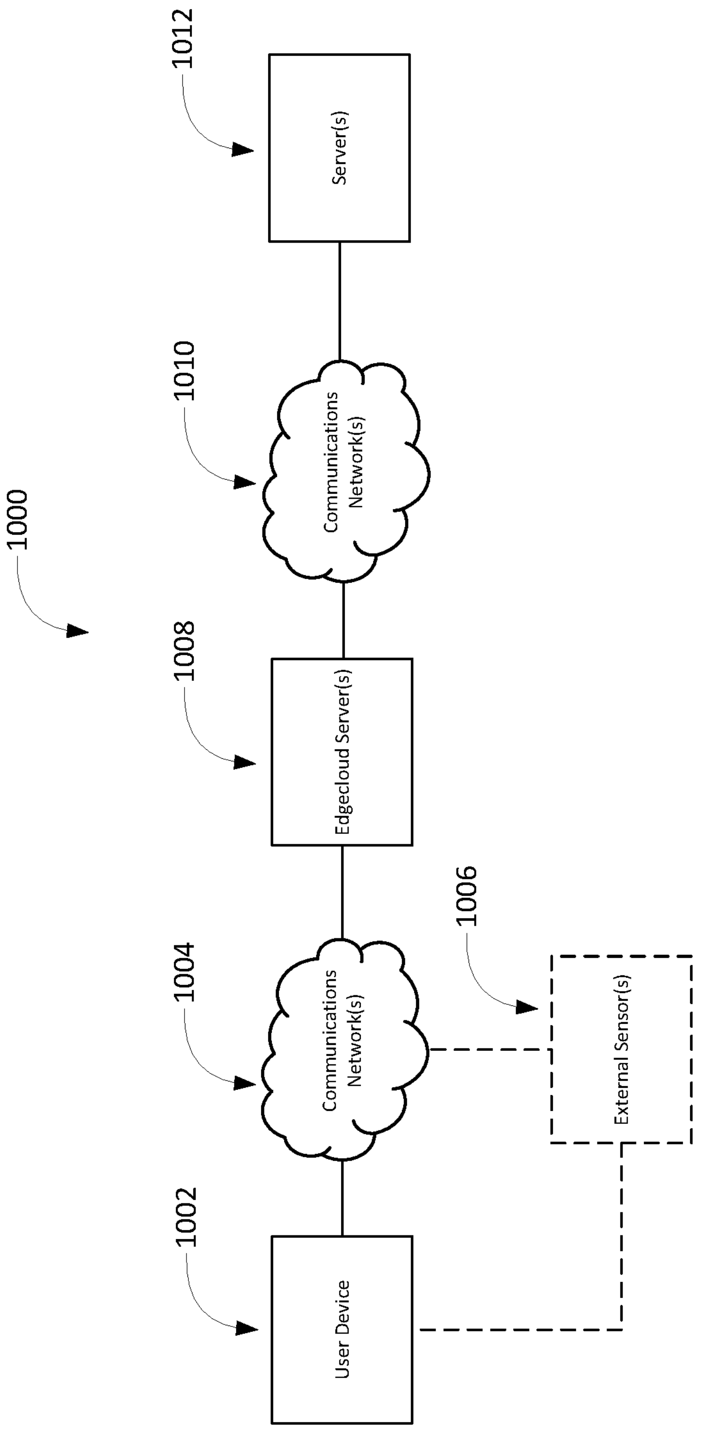
FIG. 10 illustrates an exemplary architecture of functional blocks in accordance with some embodiments.

FIG. 10 illustrates a diagram of an example network that can be used to perform the techniques described herein in accordance with some embodiments. Network 1000 includes a user device 1002 (e.g., a wearable XR headset user device) that is connected via one or more communication network 1004 (e.g., a 3GPP communication network, such as 5G NR) to one or more edgecloud server 1008. User device 1002 can include one or more of the components described above with respect to device 700. Edgecloud server(s) 1008 can include one or more of the components described above with respect to device 700. The communication network(s) 1004 can include one or more base station, access point, and/or other network connectivity and transport infrastructure. Network 1000 optionally includes one or more external sensor 1006 (e.g., environmental sensor, camera, microphone) that is in communication with user device 1002, edgecloud server(s) 1008, or both. Edgecloud server(s) 1008 can be network edge servers that are selected to process data from user device 1002 based on a relative closeness of physical proximity between the two. Edgecloud 1008 is connected to one or more server 1012 via one or more communication network 1010. Server(s) 1012 can include network provider servers, application servers (e.g., a host or content provider of an XR or VR environment application), or any other non-network edge server that receives data from the user device 1002. The communication network(s) 1010 can include one or more base station, access point, and/or other network connectivity and transport infrastructure. One of skill in the art would appreciate that one or more of the components of network 1000 can be rearranged, omitted, or substituted which achieving the same functionality for the embodiments described herein, all modifications which are intended to be within the scope of this disclosure. Further, one of skill would appreciate that the use of an edgecloud server can be due to considerations of lowering latency based on current technology—however, as technology progresses the need for an edgecloud server can be obviated, and thus omitted from network 1000 without an unacceptable increase in latency for embodiments described herein: in such case, where reference is made to an edgecloud server herein, this can be construed as a server without regard to a physical or logical positioning (e.g., at the edge of a network).

At least some of the following abbreviations may be used in this disclosure. If there is an inconsistency between abbreviations, preference should be given to how it is used above. If listed multiple times below, the first listing should be preferred over any subsequent listing(s).

XR Extended Reality
IoT Internet of Things
NR New Radio
LTE Long Term Evolution
VR Virtual reality
AR Augmented reality
Edgecloud Edge- and cloud-computing
3GPP 3rd Generation Partnership Project
5G 5th Generation
eNB E-UTRAN NodeB
gNB Base station in NR
LTE Long-Term Evolution
NR New Radio
RAN Radio Access Network
UE User Equipment

The invention claimed is:

1. A method for processing of event data at an edgecloud that provides edge and cloud computing at an edge node of a wireless communication network and for providing feedback to a user device capable of extended reality (XR) presentation, comprising:
- receiving event data from one or more sensors as data packets sent over the wireless communication network, wherein the event data represents an event detected in a sensory environment associated with the user device;
- processing the event data at the edgecloud, including:
  - performing a localization operation using the event data to determine location data representing the event in the sensory environment;
  - performing a labeling operation using the event data to determine one or more labels representing the event, wherein the one or more labels comprise:
    - a semantic label that projects recognition context through visual, audio, or tactile production of words to communicate a type of stimulus located;
    - a proximity label that indicates proximity of sensory stimulus in an environment of the user device; and
    - a magnitude label that indicates magnitude or intensity of the sensory stimulus;
  - assigning a priority value to the event data; and
  - augmenting the event data using a third-party service;

determining, based on a set of criteria, whether to perform a prioritization action related to the event data based on the priority value;

wherein the prioritization action comprises: processing of the event data by selecting a location to process the event data based on the priority value, transmission of communication packets of the event data based on the priority value, and rendering of sensory feedback by setting visual resolution of the sensory feedback based on the priority value and by displaying the one or more labels based on the priority value;

in response to determining to perform the prioritization action, generating an output to perform one or more prioritization action by one or more sensory feedback device of the user device, of the sensory feedback in at least one sensory dimension based on the event data, the location data, and the one or more labels; and transmitting the output to the user device via the wireless communication network.

2. The method of claim 1, wherein the at least one sensory dimension includes one or more of visual sensory output, audio sensory output, haptic sensory output, olfactory sensory output, and gustatory sensory output, and wherein the sensory feedback represents the location data and the one or more labels to indicate presence of the event in the sensory environment.

3. The method of claim 1, wherein the at least one sensory dimension, of the sensory feedback, differs in type from a captured sensory dimension of the one or more sensors.

4. The method of claim 1, wherein prioritizing transmission of the event data comprises one or more of:

causing transmission of one or more communication packets associated with the event data prior to transmitting non-prioritized communication packets; and causing transmission of one or more communication packets using a faster transmission resource.

5. The method of claim 1, wherein prioritizing rendering includes:

enhancing the sensory feedback in at least one sensory dimension prior to the output for the sensory feedback.

6. The method of claim 5, wherein enhancing the sensory feedback in at least one sensory dimension comprises rendering augmented sensory information or additional contextual information, or both, for output at the user device.

7. The method of claim 5, wherein the sensory feedback is a visual overlay output on a display of the user device, wherein the event in the sensory environment occurred outside of a current field-of-view of the display of the user device, and wherein enhancing the sensory feedback in at least one sensory dimension comprises increasing visual resolution of the sensory feedback relative to non-prioritized visual feedback that is outside the current field-of-view.

8. The method of claim 1, wherein performing the one or more prioritization action includes prioritizing processing of the event data, wherein prioritizing processing of the event data comprises one or more of:

causing processing of one or more communication packets associated with the event data prior to occur out of turn; and causing processing of one or more communication packets to be added to a priority processing queue.

9. The method of claim 1, wherein the priority value is included in a transmission of event data to the third-party service.

10. The method of claim 1, wherein the set of criteria includes one or more of:

the event data, the location data, the one or more labels, user preferences, and information about a user.

11. The method of claim 1, wherein the edgecloud performs local priority processing of the event data based at least on one or more of local processing resources, remote processing resources, and a transmission latency between local processing resources and remote processing resources.

12. The method of claim 1, wherein the event in the sensory environment is a potential environmental hazard, in the sensory environment, to a user of the user device.

13. A system for processing event data at an edgecloud that provides edge and cloud computing at an edge node of a wireless communication network and for providing feedback to a user device capable of extended reality (XR) presentation, the system comprising:

one or more processors; and a memory including instructions executable by said one or more processors to cause the system to:

receive event data from one or more sensors as data packets sent over the wireless communication network, wherein the event data represents an event detected in a sensory environment associated with the user device;

process the event data at the edgecloud, including:

perform a localization operation using the event data to determine location data representing the event in the sensory environment;

perform a labeling operation using the event data to determine one or more labels representing the event, wherein the one or more labels comprise:

a semantic label that projects recognition context through visual, audio, or tactile production of words to communicate a type of stimulus located;

a proximity label that indicates proximity of sensory stimulus in an environment of the user device; and a magnitude label that indicates magnitude or intensity of the sensory stimulus;

assigning a priority value to the event data; and augment the event data using a third-party service;

determine, based on a set of criteria, whether to perform a prioritization action related to the event data based on the priority value;

wherein the prioritization action comprises: processing of the event data by selecting a location to process the event data based on the priority value, transmission of communication packets of the event data based on the priority value, and rendering of sensory feedback by setting visual resolution of the sensory feedback based on the priority value and by displaying the one or more labels based on the priority value;

in response to determining to perform the prioritization action, generate an output to perform one or more prioritization action by one or more sensory feedback device of the user device, of the sensory feedback in at least one sensory dimension based on the event data, the location data, and the one or more labels; and transmit the output to the user device via the wireless communication network.

14. A non-transitory computer readable storage medium comprising instructions executable by one or more processors of a device, said instructions including instructions to perform operations for processing of event data at an edgecloud that provides edge and cloud computing at an edge node of a wireless communication network and for providing feedback to a user device capable of extended reality (XR) presentation, the operations comprising:

receiving event data from one or more sensors as data packets sent over the wireless communication network, wherein the event data represents an event detected in a sensory environment at the edgecloud;

processing the event data at the edgecloud, including:

performing a localization operation using the event data to determine location data representing the event in the sensory environment;

performing a labeling operation using the event data to determine one or more labels representing the event, wherein the one or more labels comprise:

a semantic label that projects recognition context through visual, audio, or tactile production of words to communicate a type of stimulus located;

a proximity label that indicates proximity of sensory stimulus in an environment of the user device; and a magnitude label that indicates magnitude or intensity of the sensory stimulus;

assigning a priority value to the event data; and augmenting the event data using a third-party service;

determining, based on a set of criteria, whether to perform a prioritization action related to the event data based on the priority value;

wherein the prioritization action comprises: processing of the event data by selecting a location to process the event data based on the priority value, transmission of communication packets of the event data based on the priority value, and rendering of sensory feedback by setting visual resolution of the sensory feedback based on the priority value and by displaying the one or more labels based on the priority value;

in response to determining to perform the prioritization action, generating an output to perform one or more prioritization action by one or more sensory feedback device of the user device, of the sensory feedback in at least one sensory dimension based on the event data, the location data, and the one or more labels; and transmitting the output to the user device via the wireless communication network.

* * * * *